United States Patent [19] [11] Patent Number: 4,956,972
Sasajima et al. [45] Date of Patent: Sep. 18, 1990

[54] METHOD OF CONTROLLING SPEED REDUCTION RATIO FOR A CONTINUOUSLY VARIABLE SPEED TRANSMISSION

[75] Inventors: Koji Sasajima, Tokyo; Kouji Yamaguchi, Saitama, both of Japan

[73] Assignee: Honda Giken Kogyo Kabushiki Kaisha, Tokyo, Japan

[21] Appl. No.: 286,381

[22] Filed: Dec. 16, 1988

[30] Foreign Application Priority Data

Dec. 18, 1987 [JP] Japan ................................ 62-320174

[51] Int. Cl.$^5$ ............................................. F16H 61/42
[52] U.S. Cl. ...................................... 60/327; 60/487;
74/866; 364/424.1
[58] Field of Search .......... 60/327, 431, 445, 448–449,
60/459, 468, 469, 487–489, 494; 180/307;
74/866; 364/424.1

[56] References Cited

U.S. PATENT DOCUMENTS 4,229,998 10/1980 Mizuno et al. ........................ 74/865
4,534,707 8/1985 Mitchell ............................. 60/431 X
4,637,279 1/1987 Itoh et al. ............................... 74/866
4,653,006 3/1987 Osanai et al. ...................... 364/424.1
4,663,990 5/1987 Itoh et al. ................................ 74/866
4,672,811 6/1987 Yoshida et al. ..................... 60/445 X
4,683,779 4/1987 Osanai et al. ........................... 74/861
4,811,225 3/1989 Petzold et al. .................... 364/424.1

FOREIGN PATENT DOCUMENTS 63-53343 3/1988 Japan .
63-53344 3/1988 Japan .
WO79/00036 2/1979 PCT Int'l Appl. .................... 60/431

Primary Examiner—Edward K. Look
Assistant Examiner—George Kapsalas
Attorney, Agent, or Firm—Lyon & Lyon

[57] ABSTRACT

The speed reduction ratio of a continuously variable speed transmission for transmitting engine power with continuously variable speed to drive road wheels is controlled by detecting a parameter representing a driver's intention of acceleration or deceleration, establishing a reference engine speed corresponding to the detected parameter, and controlling the speed reduction ratio so as to equalize an actual engine speed with the reference engine speed, at a predetermined time interval. When the actual engine speed is lower than the reference engine speed, a controlling ouput value for the speed reduction ratio for bringing the actual engine speed into agreement with the reference engine speed is established based on the difference between the actual engine speed and the reference engine speed, and a predicted engine speed after elapse of the predetermined time interval is calculated based on the rate of change of the actual engine speed. When the predicted engine speed is higher than the reference engine speed, the controlling output value is corrected to lower the predicted engine speed below the reference engine speed after elapse of the predetermined time interval.

4 Claims, 6 Drawing Sheets

METHOD OF CONTROLLING SPEED REDUCTION RATIO FOR A CONTINUOUSLY VARIABLE SPEED TRANSMISSION

BACKGROUND OF THE INVENTION

The present invention relates to a method of controlling the speed reduction ratio of a continuously variable speed transmission for use in a motor vehicle.

One known method of controlling the speed reduction ratio of a continuously variable speed transmission mounted on a motor vehicle comprises the steps of establishing a reference engine speed corresponding to a throttle valve opening of the engine, and controlling the engine rotational speed so as to be equal to the reference engine speed.

For controlling the speed reduction ratio in the above manner, it is necessary to optimize the rate of change of the speed reduction ratio for preventing a delay in speed change, racing of the engine, hunting, and the like. To meet such a requirement, there has been proposed a method of controlling the speed reduction ratio of a continuously variable speed transmission by calculating the rate of change of the speed reduction ratio as the sum of a component corresponding to a predicted acceleration and a component corresponding to the rate of change of a reference engine speed, and using the calculated ratio varying speed as a controlling value (see Japanese Laid-Open Patent Publication Nos. 63(1988)-53343 and 63(1988)-53344, for example).

With the proposed method, when the actual engine speed is lower than the reference engine speed, in order to increase the actual engine speed up to the reference engine speed, a rate of change (which is the component corresponding to the rate of change of the reference engine speed) of the speed reduction ratio corresponding to the difference between the actual and reference engine speeds is calculated, and the speed reduction ratio is controlled on the basis of the calculated rate of change.

The rate of change of the speed reduction ratio is usually calculated by a microcomputer or the like at prescribed time intervals (each of several tens of milliseconds, for example). After a rate of change of the speed reduction ratio has been calculated according to the engine speed and the throttle valve opening at a certain time, the calculated rate of change is maintained until a next rate of change of the speed reduction ratio is calculated upon elapse of the above time interval. During this time interval, the actual engine speed may become higher than or overshoot the reference engine speed.

The above problem may be solved by establishing a different rate of change of the speed reduction ratio for the difference between a reference engine speed and an actual engine speed or by lowering the response of the control system. However, it would be quite difficult to establish such a different rate of change of the speed reduction ratio. Individual speed reduction ratio control mechanisms tend to respond differently to the established rate of change, and hence tend to perform different control operations.

SUMMARY OF THE INVENTION

In view of the aforesaid problems, it is an object of the present invention to provide a method of controlling the speed reduction ratio of a continuously variable transmission based on a reference engine speed without causing an actual engine speed to overshoot the reference engine speed.

To achieve the above object, when an actual engine speed is lower than a reference engine speed which has been established according to a parameter representing a driver's intention of acceleration or deceleration such as an accelerator opening, a controlling output value for the speed reduction ratio of a continuously variable speed transmission to increase the actual engine speed is established based on the difference between the actual engine speed and the reference engine speed for bringing the actual engine speed into agreement with the reference engine speed. Based on the rate of change of the actual engine speed at the time of issuing the controlling output value, a predicted engine speed after elapse of a predetermined time interval is calculated. When the predicted engine speed is higher than the reference engine speed, the controlling output value is corrected to lower the predicted engine speed below the reference engine speed. The accelerator opening means the extent to which an accelerator pedal is depressed, the opening of a throttle valve, or the like.

If the reference engine speed becomes higher than the actual engine speed through depression of the accelerator pedal, for example, a rate of change of the speed reduction ratio for increasing the actual engine speed up to the reference engine speed is calculated, as a controlling output value for the speed reduction ratio, from a predetermined table or the like based on the controlling output value for increasing the actual engine speed into agreement with the reference engine speed. When the controlling output value is calculated, a predicted engine speed after elapse of the predetermined time interval (i.e., at the time a next controlling output value is calculated) is simultaneously calculated based on the rate of change of the actual engine speed. When the predicted engine speed is higher than the reference engine speed, i.e., if the engine speed is assumed to overshoot the reference engine speed should the controlling output value be maintained for the predetermined time interval, then the controlling output value is corrected to lower the predicted engine speed below the reference engine speed after elapse of the predetermined time interval, thereby preventing the engine speed from overshooting the reference engine speed.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the present invention and wherein.

DESCRIPTION OF THE PREFERRED EMBODIMENT

Figure 1:
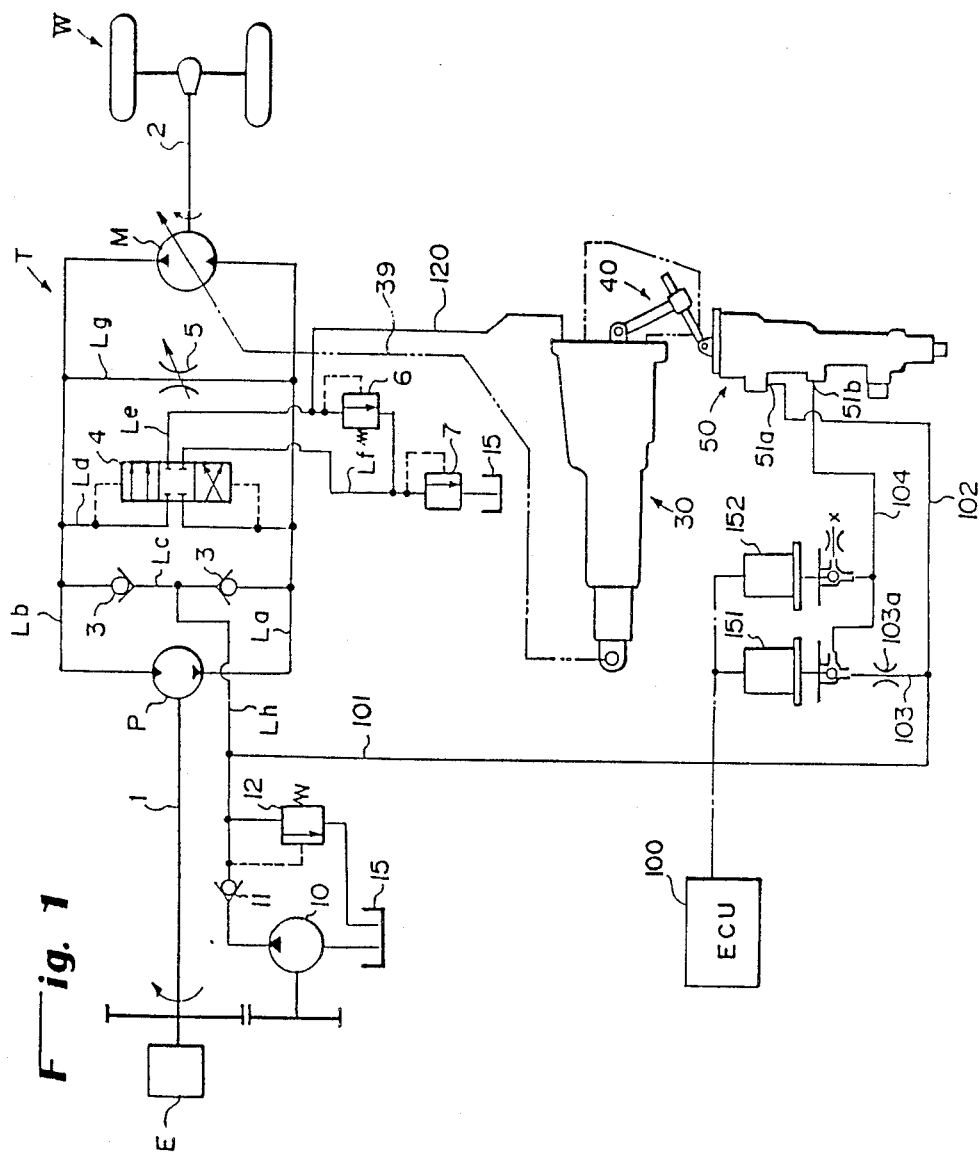
FIG. 1 is a hydraulic circuit diagram of a continuously variable speed transmission, the speed reduction ratio of which is controlled by a method according to the present invention.

FIG. 1 shows a hydraulic circuit of a continuously variable speed transmission, the speed reduction ratio of which is controlled by a method of the present invention. The continuously variable speed transmission, generally indicated by T, has a hydraulic pump P of the fixed displacement type which is drivable by an engine E through an input shaft 1, and a hydraulic motor M of the variable displacement type which has an output shaft 2 for driving wheels W. The hydraulic pump P and the hydraulic motor M are hydraulically coupled to each other by a closed hydraulic circuit having a first hydraulic passage or line La communicating with the outlet port of the pump P and the inlet port of the motor M, and a second hydraulic line Lb communicating with the inlet port of the pump P and the outlet port of the motor M.

A charging pump 10 drivable by the engine E has an outlet port connected to the closed hydraulic circuit through a charging hydraulic line Lh having a check valve 11 and a third hydraulic line Lc having a pair of check valves 3. Working oil which is drawn from an oil sump 15 by the charging pump 10 and regulated in pressure by a charging pressure relief valve 12 is supplied to a lower-pressure one of the hydraulic lines La, Lb through the action of the check valves 3. To the closed hydraulic circuit, there is also connected a fourth hydraulic line Ld having a shuttle valve 4 coupled to fifth and sixth hydraulic lines Le, Lf that have respectively high and Low pressure relief valve 6, 7, which relief valves 6, 7 are also connected to the oil sump 15. The shuttle valve 4 comprises a two-port three-position directional control valve which is operable in response to the difference between hydraulic pressures in the first and second hydraulic lines La, Lb for communicating a higher-pressure one of the first and second hydraulic lines La, Lb with the fifth hydraulic line Le and communicating the lower-pressure line with the sixth hydraulic line Lf. The relief pressure from the higher-pressure hydraulic line is regulated by the higher-pressure relief valve 6, and the relief pressure from the lower-pressure hydraulic line is regulated by the lower-pressure relief valve 7.

Between the first and second hydraulic lines La, Lb there is connected a seventh hydraulic line Lg providing a short circuit therebetween, the seventh hydraulic line Lg having a clutch valve 5 comprising a variable restrictor for controlling the opening of the seventh hydraulic line Lg under the control of a valve control unit (not shown). Therefore, the transmission of driving power from the hydraulic pump P to the hydraulic motor M can be controlled by controlling the clutch valve 5.

The displacement of the hydraulic motor M is controlled to control the speed reduction ratio of the continuously variable speed transmission T by an actuator comprising first and second ratio control servo units 30, 50 which are operatively interconnected by a link mechanism 40. The hydraulic motor M comprises a swash-plate axial-piston motor with its displacement controllable by controlling the angle of inclination of the swash plate with the ratio control servo units 30, 50.

Operation of the ratio control servo units 30, 50 is controlled by solenoid valves 151, 152, the duty cycle of which is controlled by a signal from a controller 100. The controller 100 is supplied with signals respectively representing a vehicle speed V, an engine rotational speed Ne, a throttle valve opening $\theta$th, a swash plate angle $\theta$tr of the hydraulic motor M, and an acceleration dV/dt of the motor vehicle which is operated by the driver. Based on the supplied signals, the controller 100 produces a control signal to control the solenoid valves 151, 152 for achieving a desired running mode or condition for the motor vehicle.

Figure 2:
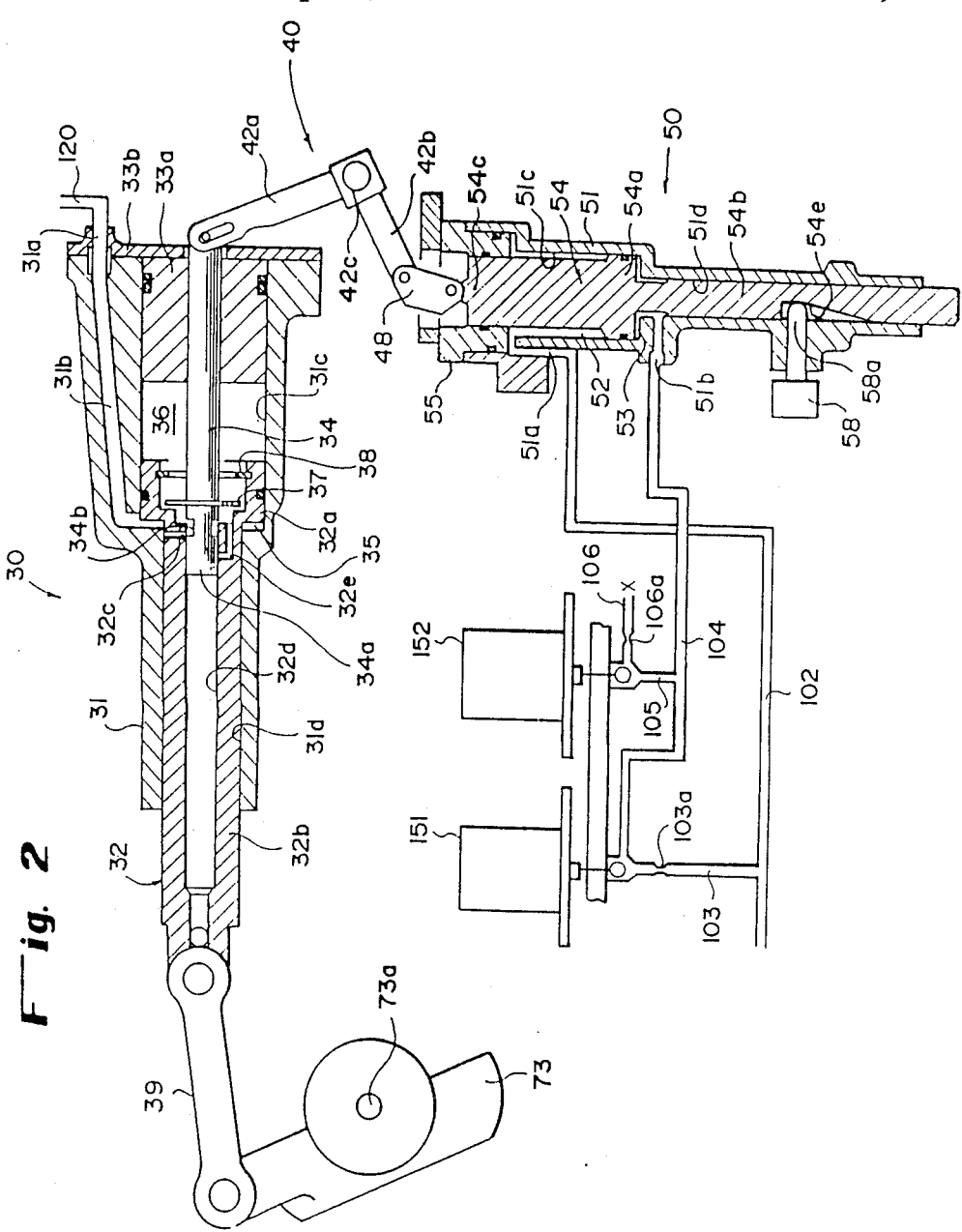
FIG. 2 is a cross-sectional view of first and second ratio control servo units.

The structure and operation of the servo units 30, 50 will be described below with reference to FIG. 2.

The first ratio control servo unit 30 controls the angle of the swash plate of the hydraulic motor M under a high hydraulic pressure introduced via a high-pressure line 120 branched off the fifth hydraulic line Le from the closed circuit of the continuously variable speed transmission T through the shuttle valve 4. The second ratio control servo unit 50 is operatively coupled to the first ratio control servo unit 30 through the link mechanism 40 for controlling the operation of the servo unit 30.

The first ratio control servo unit 30 has a housing 31 having a connector port 31a to which the high-pressure line 120 is connected, a piston 32 horizontally (as shown) slidably fitted in the housing 31, and a spool 34 slidably fitted coaxially in the piston 32. The piston 32 comprises a piston member 32a on its righthand end, and a cylindrical rod member 32b extending coaxially from the piston member 32a to the left (as shown in FIG. 2). The piston member 32a is fitted in a cylinder bore 31c defined in the housing 31, dividing the cylinder bore 31c into lefthand and righthand (as shown in FIG. 2) cylinder chambers 35, 36. The rod member 32b is slidably fitted in a rod bore 31d which is defined coaxially with the cylinder bore 31c and smaller in diameter than the cylinder bore 31c. The righthand cylinder chamber 36 is closed off by a plug 33a and a cover 33b, through which the spool 34 extends.

The lefthand cylinder chamber 35 is held in communication with the high-pressure line 120 through a hydraulic passage 31b. The piston 32 is therefore pushed to the right under the hydraulic pressure introduced from the high-pressure line 120 into the lefthand cylinder chamber 35.

The spool 34 has on its inner distal end a land 34a snugly fitted in a spool bore 32d defined coaxially in the rod member 32b. The spool 34 also has a pair of diametrically opposite recesses 34b defined therein on the righthand side of the land 34a and having prescribed axial dimensions. A stop ring 37 is fixedly fitted over the spool 34 rightwardly of the recesses 34b. The land 34a is prevented from moving out of the spool bore 32d by the stop ring 37 which engages a stop ring 38 secured to the inner peripheral surface of the piston member 32a.

The piston 32 has a discharge passage 32e defined therein for venting the righthand cylinder chamber 36 through the spool bore 32d to the oil sump (not shown in FIG. 2) when the spool 34 is moved to the right, and a communication passage 32c defined therein for communicating the righthand cylinder chamber 36 with the lefthand cylinder chamber 35 through the recesses 34b upon leftward movement of the spool 34.

By moving the spool 34 to the right from the illustrated position, the land 34a closes the communication passage 32c and opens the discharge passage 32e. Therefore, oil under pressure flowing from the high-pressure line 120 via the hydraulic passage 31b acts in only the lefthand cylinder chamber 35 to move the piston 32 to the right in synchronism with the spool 34.

When the spool 34 is moved to the left, the recesses 34b bring the communication passage 32c into communication with the righthand cylinder chamber 36, and the land 34a closes the discharge passage 32e. Consequently, the high-pressure oil acts in both the lefthand and righthand cylinder chambers 35, 36. Because the piston member 32a has different pressure-bearing areas facing into the lefthand and righthand cylinder chambers 35, 36, the piston 32 is moved to the left in synchronism with the spool 34.

When the spool 32 is stopped somewhere in its stroke, the piston 32 is also stopped in a hydraulically balanced condition due to the balanced pressures in the lefthand and righthand cylinder chambers 35, 36.

By moving the spool 34 to the left or the right, the piston 32 can be moved in synchronism with the spool 34 under the high hydraulic pressure introduced from the high-pressure line 120. As a consequence, the swash plate, indicated by 73, of the hydraulic motor M which is operatively coupled to the piston 32 through a link 39 can be angularly moved about a shaft 73a to variably control the displacement of the motor M.

The spool 34 is operatively connected to the second ratio control servo unit 50 through the link mechanism 40. The link mechanism 40 comprises a first link member 42 having two arms 42a, 42b angularly movable about a shaft 42c and extending substantially perpendicularly to each other, and a second link member 48 pivotally coupled to the distal end of the arm 42b of the first link member 42b. The upper end of the arm 42a is pivotally connected to the righthand end of the spool 34 of the first ratio control servo unit 30. The lower end of the second link member 48 is pivotally coupled to a spool 54 of the second ratio control servo unit 50. When the spool 54 is moved vertically (FIG. 2), therefore, the spool 34 of the first ratio control servo unit 30 is moved horizontally.

The second ratio control servo unit 50 comprises a housing 51 having ports 51a, 51b to which two respective hydraulic lines 102, 104 are connected, and the spool 54 vertically slidably fitted in the housing 51. The spool 54 comprises a piston member 54a and a rod member 54b extending coaxially downwarly from the piston member 54a. The piston member 54a is fitted in a cylinder bore 51c defined vertically in the housing 51 and closed by a cover 55, dividing the cylinder bore 51c into upper and lower cylinder chambers 52, 53. The rod member 54b is slidably fitted in a rod bore 51d defined in the housing 51 and extending coaxially downwardly from the cylinder bore 51c.

The rod member 54b has a recess 54e defined in a side surface thereof and including a tapered surface. A top position detecting switch 58 mounted on the housing 51 has a spool 58a projecting into the recess 54e. Upon the upward movement of the spool 54, the spool 58a is displaced laterally to the left by the tapered surface for enabling the switch 58 to detect whether the speed reduction ratio of the hydraulic motor M is minimized or not.

The upper and lower cylinder chambers 52, 53 are held in communication with the respective hydraulic lines 102, 104 through ports 51a, 51b respectively. The piston 54 is vertically moved under a hydraulic pressure acting on the piston member 54a which is determined by the pressure of working oil supplied via the hydraulic lines 102, 104 into the cylinder chambers 52, 53 and the pressure-bearing areas of the piston member 54a that faces into the cylinder chamber 52, 53. The vertical movement of the spool 54 is transmitted through the link mechanism 40 to the spool 34 of the first ratio control servo unit 30 to move the spool 34 to the left or the right. Consequently, by controlling the hydraulic pressure supplied through the hydraulic lines 102, 104, the movement of the spool 34 of the first ratio control servo unit 30 can be controlled, and the piston can be moved to control the angle of the swash plate 73 of the hydraulic motor M to vary the displacement of thereof for the control of the speed reduction ratio. More specifically, when the spool 54 of the second ratio control servo unit 50 is moved upwardly, the piston 52 of the first ratio control servo unit 30 is moved to the right to reduce the swash plate angle, thereby reducing the displacement of the hydraulic motor M to decrease the speed reduction ratio.

The hydraulic pressure in the hydraulic line 102 connected to the upper cylinder chamber 52 via the port 51a is the hydraulic pressure discharged from the charging pump 10, as regulated by the charging pressure relief valve 12, and introduced via a hydraulic line 101 connected to the hydraulic line 102. The hydraulic pressure in the hydraulic line 104 connected to the lower cylinder chamber 53 via the port 51b is the hydraulic pressure supplied from a hydraulic line 103 branched off the hydraulic line 102 and having an orifice 103a, as controlled by the two solenoid valves 151, 152 with their duty cycle being controlled by the controller 100. The solenoid valve 151 serves to control, dependent on its controlled duty cycle, the rate of flow of the working oil from the hydraulic line 103 into the hydraulic line 104. The solenoid valve 152 is disposed between a hydraulic line 105 branched off the hydraulic line 104 and a hydraulic line 106 communicating with a drain via an orifice 106a for controlling the rate of flow of the working oil from the hydraulic line 104 into the drain dependent on the controlled duty cycle of the solenoid valve 152.

Therefore, the charging pressure as regulated by the charging pressure relief valve 12 and supplied via the hydraulic line 102 acts in the upper cylinder 52. The lower cylinder 53 is supplied with a hydraulic pressure from the hydraulic line 104 which is made lower than the charging pressure by the solenoid valves 151, 152. Since the pressure-bearing area of the piston member 54a facing into the upper cylinder chamber 52 is smaller than the pressure-bearing area of the piston member 54a facing into the lower cylinder chamber 53, the forces acting on the spool 54 due to the respective hydraulic pressure in the upper and lower cylinder chambers 52, 53 are brought into equilibrium when the hydraulic pressure in the lower cylinder chamber 53 is a balancing pressure Pl lower than the hydraulic pressure Pu in the upper cylinder chamber 52 (Pu>Pl). As a consequence, by controlling the hydraulic pressure supplied from the hydraulic line 104 into the lower cylinder chamber 53 to be higher than the balancing pressure Pl, the spool 54 can be moved upwardly to reduce the swash plate angle of the hydraulic motor M for decreasing the speed reduction ratio. Conversely, by controlling the hydraulic pressure supplied into the lower cylinder chamber 53 to be lower than the balancing pressure Pl, the spool member 54 can be moved downwardly to increase the swash plate angle for increasing the speed reduction ratio.

The solenoid valves 151, 152 are controlled in operation by a signal from the controller 100. Therefore, the signal from the controller 100 is effective in controlling the operation of the first and second ratio control servo units 30, 50, controlling the displacement of the hydraulic motor M, and controlling the speed reduction ratio.

The speed reduction ratio i {=(input speed)/(output speed)} is expressed by the following equation (1):

$$i = \frac{N}{(C' * V)} \tag{1}$$

where N is the engine rotational speed, V is the vehicle speed, and C' is a constant. the rate of change of the speed reduction ratio di/dt is obtained by differentiating the equation (1) with time t, as follows:

$$di/dt = \frac{1}{C' * V} * \left( dN/dt - \frac{N}{C' * V} * C' * dV/dt \right) \tag{2}$$

By replacing the rate of change dN/dt of the engine speed with the rate of change dNo/dt of the reference engine speed, the acceleration dV/dt with a predicted acceleration dVo/dt, and putting C'=1/C in the equation (2), $$di/dt = -C * \frac{N}{V^2} * dVo/dt + C * \frac{1}{V} * dNo/dt \tag{3}$$

Therefore, the rate of change di/dt of the speed reduction ratio is given as the sum of a component dia/dt (= −C * N/V² * dVo/dt) corresponding to the predicted acceleration dVo/dt and a component diN/dt (=C * 1/V * dNo/dt) corresponding to the rate of change dNo/dt of the reference engine speed. The predicted acceleration dVo/dt is obtained from the following equations (4) through (7):

The output power Pe of the engine E itself is expressed by:

$$Pe = Ru + Ra + Pa \tag{4}$$

where Ru is the resistance of the road, Ra is the resistance of air, and Pa is the reserved power of the engine E. From the equation (4), the reserved power of the engine E is given by:

$$Pa = Pe - (Ru + Ra) \tag{5}$$

The reserved engine power Pa can also be expressed by the equation (6):

$$Pa = (W + dW) * \frac{1}{g} * dVo/dt * \left( \frac{V * 10^3}{60^2} \right) * \frac{1}{75} \tag{6}$$

From the equations (5) and (6), we get $$dVo/dt = Pa * \frac{g * 60^2}{(W + dW) * (V * 10^3)} * 75 \tag{7}$$

Thus, the predicted acceleration dVo/dt can be calculated from the reserved power Pa of the engine E, which can be determined by the equation (5). The rate of change dNo/dt of the reference engine speed can be obtained by calculating the difference dN between the reference engine speed No corresponding to a parameter representing the driver's intention of acceleration or deceleration and the actual engine speed N, and searching a table or map of rates of change dNo/dt of the reference engine speed which are related to values of the difference dN in view of the driver's feeling as to the running of the motor vehicle and fuel consumption.

The calculation of the rate of change di/dt of the speed reduction ratio, and the control of the speed reduction ratio based on the calculated rate of change di/dt are effected by the controller 100 at prescribed time intervals (each of 10 milliseconds, for example). The control sequence will be described with reference to the flowchart of FIG. 3.

Figure 4:
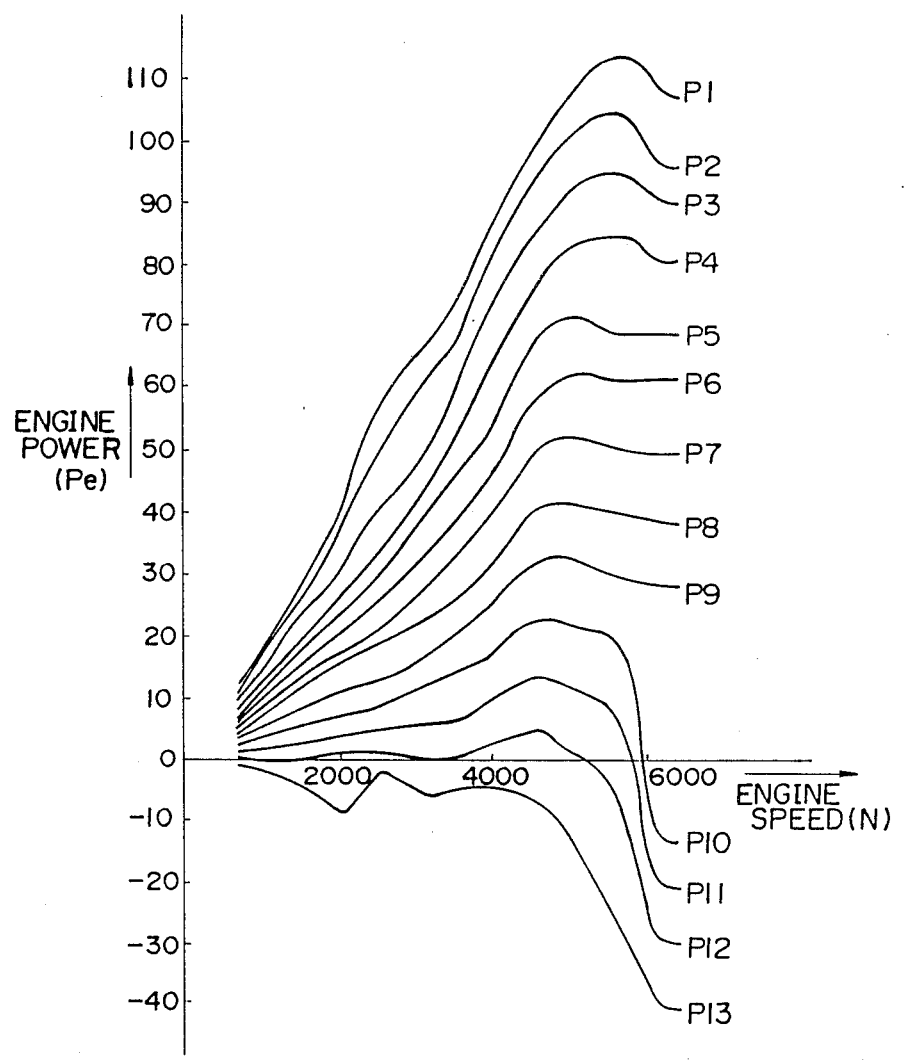
FIGS. 4 and 6 are graphs respectively showing a map for determining engine output power and a map for determining a reference speed at which an engine speed is to be varied.

The engine speed N and the vehicle speed V are read in a first step S1, and the reserved power Pa of the engine is calculated in a second step S2. The reserved power Pa of the engine is calculated according to the equation (5). The output power Pe of the engine E itself can be obtained from a map as shown in FIG. 4. More specifically, the graph of FIG. 4 has a horizontal axis indicating the engine speed N and vertical axis indicating the engine output power Pe with respect to a plurality of intake vacuum pressures P1 through P13 used as parameters. In the map of FIG. 4, the engine output power Pe is determined from the engine speed N and the intake vacuum pressure.

The engine output power Pe thus obtained is given irrespective of the transmission efficiency. In order to determine the engine output power accurately, the engine output power Pe has to be corrected by the product $E_M$ of a speed reduction ratio coefficient determined by the speed reduction ratio i and a transmission efficiency determined by the engine output power Pe and the engine speed N. The reserved power Pa is therefore calculated in the second step S2 while using the output power found in FIG. 4 and corrected by the efficiency $E_M$.

After the reserved power Pa has been determined, the predicted acceleration dVo/dt is determined in a third step S3 according to the equation (7). In a next fourth step S4, the predicted acceleration component dia/dt of the rate of change of the speed reduction ratio is calculated.

Then, the rate of change dNo/dt of the reference engine speed is determined in a fifth step S5. The calculation of the rate of change dNo/dt will be described with reference to the flowchart of FIG. 5.

First, a rate of increase in the engine speed at the present time is calculated, and then a predicted engine speed $N_Y$ at a next time (after the predetermined time interval) is calculated on the basis of the calculated rate of increase in the engine speed. Then, it is determined whether the predicted engine speed $N_Y$ is higher than the reference engine speed No. If NY=<No, then since the engine speed will not overshoot the reference engine speed at the next time even if the rate of increase in the engine speed is maintained, a corrective amount CM2 used to lower the engine speed is set to CM2=0. If $N_Y > N_o$, then since the engine speed N will become higher than or overshoot the reference engine speed No at the next time if the rate of increase in the engine speed remains unchanged, the corrective amount CM2 used to lower the engine speed is set to a value corresponding to the difference between the predicted engine speed $N_Y$ and the reference engine speed No. The corrective amount CM2 serves to correct the rate of change $dN_o/dt$ of the reference engine speed so as to lower the engine speed below the reference engine speed No at the next time. The corrective amount CM2 may be obtained, for example, from a predetermined table based on the difference between the predicted engine speed $N_Y$ and the reference engine speed No.

Figure 6:
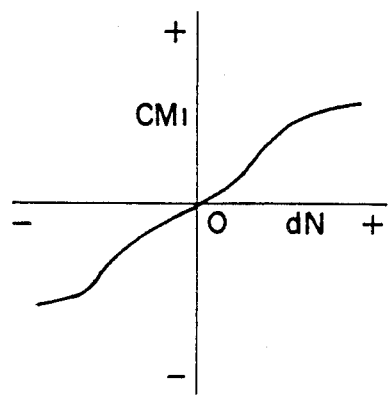

Then, the difference dN between the reference engine speed No and the actual engine speed N is calculated, and a basic rate of change CM1 of the reference engine speed is calculated dependent on the difference dN from the graph of FIG. 6 which contains different values of the basic rate of change CM1 corresponding to different values of the difference dN. Thereafter, a rate of change $dN_o/dt$ of the reference engine speed is calculated by adding the basic rate of change CM1 and the corrective amount CM2.

Figure 3:
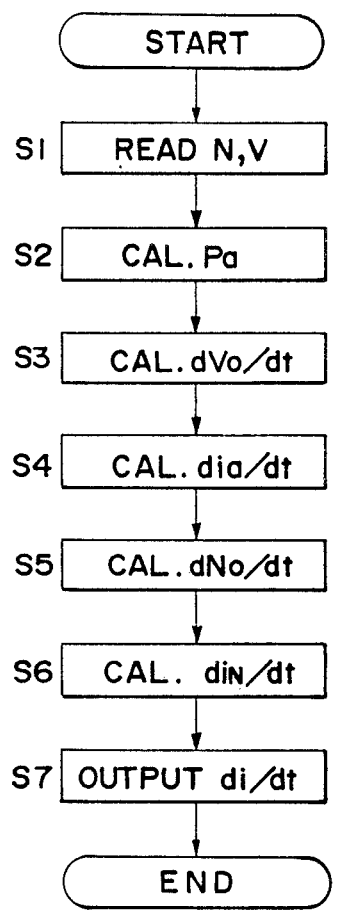
FIG. 3 is a flowchart of a control sequence for controlling the speed reduction ratio.

After the rate of change $dN_o/dt$ of the reference engine speed has been calculated in the fifth step S5 of FIG. 3, component diN/dt of the rate of change di/dt of the speed reduction ratio which corresponds to the rate of change $dN_o/dt$ of the reference engine speed is calculated in a sixth step S6.

The components dia/dt, diN/dt thus calculated are added according to the equation (3) in a seventh step S7 to provide a rate of change di/dt of the speed reduction ratio, which is used as a controlling value by the controller 100 to control the operation of the solenoid valves 151, 152.

Figure 7:
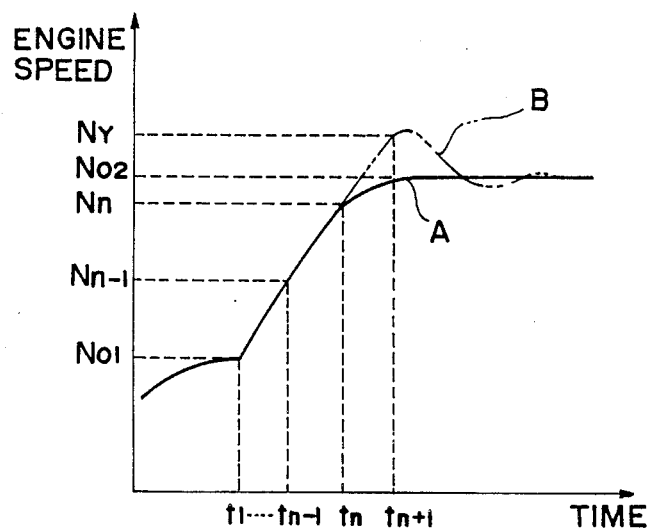
FIG. 7 is a graph showing the manner in which the engine speed varies with time during the control according to the method of the present invention.

One example of how the engine speed is varied under the above control of the speed reduction ratio will be described with reference to FIG. 7. The graph of FIG. 7 shows the engine speed as it is varied with time, e.g., a change from a reference engine speed $N_{o1}$ at a time t1 to a reference engine speed $N_{o2}$ through the depression of the accelerator pedal. When the reference engine speed No is thus changed, the speed reduction ratio is controlled so as to bring the actual engine speed N into agreement with the changed reference engine speed $N_{o2}$.

Figure 5:
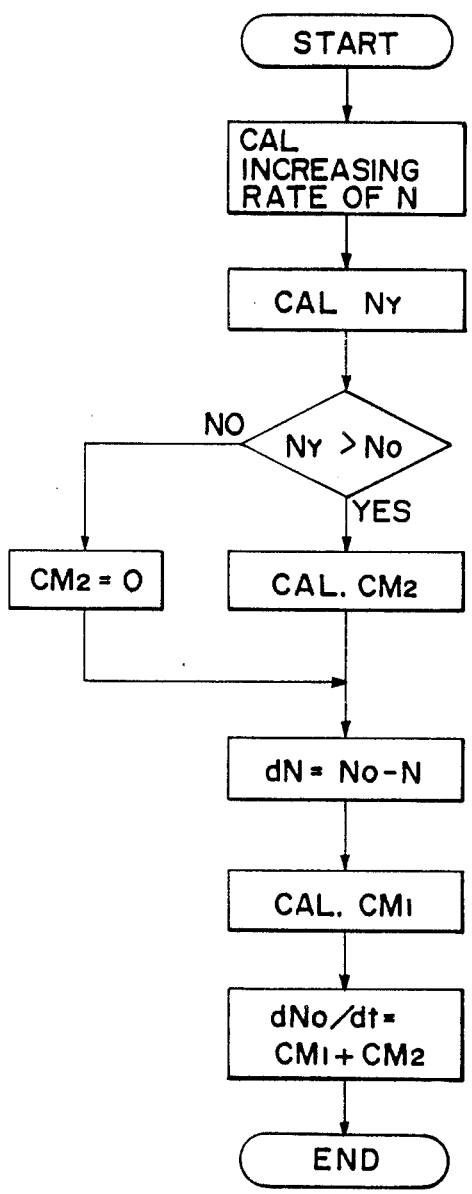
FIG. 5 is a flowchart of subroutine for determining a reference speed at which an engine speed is to be varied during the control according to the method of the present invention.

The speed reduction ratio is controlled based on the rate of change di/dt of the speed reduction ratio that is calculated according to the equation (3) at prescribed time intervals. Now, the calculation at a time $t_n$ will be described below. As shown in the flowchart of FIG. 5, a rate of increase in the engine speed at the time $t_n$ is calculated from the difference between the engine speed $N_n$ at the time $t_n$ and the engine speed $N_{n-1}$ at the previous time $t_{n-1}$. A predicted engine speed $N_Y$ at a next time $t_{n+1}$ if the calculated rate of increase is maintained is calculated. Since the predicted engine speed $N_Y$ at the next time $t_{n+1}$ is higher than the reference engine speed $N_{o2}$ in the illustrated example, the rate of change $dN_o/dt$ of the reference engine speed is calculated by being corrected by the corrective amount CM2 (the value of which is determined dependent on the difference between the predicted engine speed $N_Y$ and the reference engine speed No) for lowering the engine speed.

If the rate of change $dN_o/dt$ of the reference engine speed were not corrected, the engine speed would overshoot the reference engine speed as indicated by the two-dot chain line B in FIG. 7. With the rate of change $dN_o/dt$ being corrected as described above, the engine speed is controlled so as to smoothly reach the reference engine speed $N_{o2}$ without overshooting the latter.

In the above embodiment, the continuously variable speed transmission comprises a hydraulic pump and a hydraulic motor. However, the method of the present invention is not limited to continuously variable speed transmissions of the illustrated type, but may be applied to continuously variable speed transmissions of other designs.

With the present invention, as described above, when the reference engine speed becomes higher than the actual engine speed, the speed reduction ratio of the transmission is controlled on the basis of the rate of change of the speed reduction ratio for increasing the actual engine speed up to the reference engine speed based on the difference between the reference engine speed and the actual engine speed. In this manner, the actual engine speed is increased into agreement with the reference engine speed. When the speed reduction ratio is thus controlled, a predicted engine speed after a prescribed time interval (i.e., a predicted engine speed at the time when a next controlling output value is calculated), is also calculated. If the predicted engine speed is higher than the reference engine speed, then the controlling output value is corrected so as to lower the predicted engine speed below the reference engine speed upon elapse of the prescribed time interval. Therefore, the speed reduction ratio is controlled on the basis of the reference engine speed without allowing the engine speed to overshoot the reference engine speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling the speed reduction ratio of a continuously variable speed transmission for transmitting engine power with continuously variable speed to drive road wheels, by detecting a parameter representing a driver's intention of acceleration or deceleration, establishing a reference engine speed corresponding to the detecting parameter, and controlling the speed reduction ratio so as to equalize an actual engine speed with said reference engine speed, at a predetermined time interval, said method comprising the steps of:

when said actual engine speed is lower than said reference engine speed, establishing a controlling output value for the speed reduction ratio for bringing said actual engine speed into agreement with said reference engine speed, based on the difference between said actual engine speed and said reference engine speed, and calculating a predicted engine speed after elapse of said predetermined time interval based on the rate of change of said actual engine speed; and when said predicted engine speed is higher than said reference engine speed, correcting said controlling output value to lower said predicted engine speed below said reference engine speed after elapse of said predetermined time interval.

2. A method according to claim 1, wherein said parameter represents an accelerator opening.

3. A method according to claim 1 wherein when said predicted engine speed is lower than said reference engine speed, the speed reduction ratio is controlled so as to bring the actual engine speed into agreement with the reference engine speed.

4. A method according to claim 1 wherein said continuously variable speed transmission has a hydraulic pump coupled to said engine, a hydraulic motor coupled to an output shaft, and a closed hydraulic circuit hydraulically interconnecting said hydraulic pump and said hydraulic motor, and wherein said speed reduction ratio is controlled by variably controlling the displacement of at least one of said hydraulic pump and said hydraulic motor.

* * * * *